United States Patent Office 3,461,078
Patented Aug. 12, 1969

3,461,078
CRYSTALLINE LUMINESCENT CERAMIC MATERIALS
Frank Veres, Toledo, Ohio, assignor to Owens-Illinois, Inc., a corporation of Ohio
No Drawing. Continuation-in-part of application Ser. No. 216,289, Aug. 13, 1962. This application Nov. 22, 1966, Ser. No. 596,060
Int. Cl. C09k 1/10; C03c 3/04; C04b 35/14
U.S. Cl. 252—301.6
18 Claims

ABSTRACT OF THE DISCLOSURE

This invention comprises the preparation of a luminescent ceramic composition consisting essentially of a glassy matrix containing dispersed inorganic crystals formed in situ from a homogeneous glass containing about 25 to about 60 weight percent silica, about 30 to about 60 weight percent zinc oxide, about 1 to about 7 weight percent alumina, about 1 to about 20 weight percent strontium oxide, and a small effective amount of inorganic activator, wherein the weight ratio of silica to zinc oxide plus strontium oxide ranges from about .3 to about 1.5 and wherein the total weight of the silica, zinc oxide, alumina, strontium oxide and inorganic activator ranges from about 85 to about 100 weight percent of the glass, the remaining about 15 to about 0 weight percent being other compatible inorganic glass-making ingredients.

---

This case is a continuation-in-part of my copending U.S. application Ser. No. 216,289, filed Aug. 13, 1962, now abandoned, and my copending U.S. application Ser. No. 176,412, filed Feb. 28, 1962, now U.S. Letters Patent 3,300,670.

This invention relates to a novel ceramic material and a process for preparing same.

More particularly, this invention relates to predominately crystalline, luminescent, ceramic materials crystallized from glasses comprising zinc oxide, silica and an inorganic activator for luminescence, and to a process for their preparation. In accordance with this invention, the novel crystalline ceramic materials emit luminescence when excited by electromagnetic and particle radiation such as cathode rays and ultraviolet rays. In addition, this invention relates to novel glass compositions from which said luminescent materials can be made.

In the prior art, luminescent particles are deposited on a substrate to form screens which are used in the manufacture of X-ray, fluoroscope and intensifier devices; luminous markers, signs, dials and indicators, oscilloscopes, television picture tubes, radar screens, infra red detectors, electron microscopes, illumination devices, and in radiation detection and measurement instruments.

Luminescence is photon emission initiated by energy forms other than thermal agitation; fluorescence and phosphorescence denote, respectively, luminescence of short and long duration. The ability of a luminescent solid to emit photons upon excitation is dependent upon the arrangement and population of the electronic energy levels of its constituent atoms; suitably situated electrons migrate to higher energy levels under excitation, and emit photons upon their return to the lower levels. The requisite electronic arrangement is achieved by incorporation of a foreign ion, or inorganic activator, in a host crystal, and the combination is termed a luminescent center. Optimum luminescence is believed to be obtained when each activator ion has host ions as its nearest neighbors, and the decrease in luminescence which occurs above this concentration is referred to as concentration quenching.

Chemical interaction between a luminescent center and another chemical entity may adversely affect the desired electronic arrangement and thereby cause decreased luminescence. Iron is known to exert such an effect, as well as ions such as those of potassium and arsenic, which are for this reason called poisons. The synergism between host and activator is also disturbed by physical treatment such as excessive heating or grinding.

In addition, other considerations in the commercial use of phosphors are chemical durability, hardness, wear resistance, and current saturation. Current saturation results when the amount of exciting energy exceeds the capacity of the available luminescent centers to respond to it; thus concentration quenching and current saturation are opposing effects whose balance must be adjusted in phosphor preparation.

Commercial preparation of luminescent solids typically involves sintering a mixture of reagents selected to provide host and activator constituents; glass formation is considered undesirable, as being evidence of excessive heating. The resultant material is usually ground, and then applied as a screen or layer for purposes already cited.

A principal object of this invention is the provision of a new and improved luminescent material. Another object is the provision of a new and useful luminescent material consisting of a major portion of crystalline material formed in situ from a glass, and dispersed in a glassy matrix.

A further object of the present invention is the provision of new luminescent materials susceptible of excitation by ultraviolet or cathodic radiation.

Another object of this invention is the provision of a phosphorescent or fluorescent body comprised of luminescent crystals formed in situ from a glass, containing an activator, and protected by the residual glassy matrix, so that the luminescent body possesses improved physical properties; enhanced mechanical strength, abrasion resistance, heat resistance, and resistance to chemical attack. Another object is thus the provision of a phosphorescent or fluorescent body whose luminescence is not substantially decreased by abrasion, polishing, or exposure to chemical poisons.

A further object of the present invention is the provision of a method for making luminescent materials which comprises accomplishing the foregoing objects.

Other objects, aspects and advantages of the present invention will become apparent from the following description.

It has been found that the preparation of luminescent material(s) by deposition method(s), e.g., as generally described hereinbefore, may preclude polishing of the finally prepared material; that is, polishing of the material may disturb and affect the screen or layer of phosphor(s) deposited on the substrate. However, in accordance with this invention, it has been discovered that such problem is substantially eliminated by the preparation of a luminescent material comprising a glassy matrix containing luminescent crystals.

More particularly, in the practice of this invention there is provided a luminescent ceramic composition consisting essentially of a glass matrix containing dispersed inorganic crystals formed in situ from a homogeneous glass containing about 25 to about 60 weight percent silica, about 30 to about 60 weight percent zinc oxide, about 1 to about 7 weight percent alumina, about 1 to about 20 weight percent strontium oxide, and a small effective amount, e.g. a trace to about 5 weight percent, inorganic activator, based on the total weight of the composition, wherein the weight ratio of silica to zinc oxide plus strontium oxide $$\frac{SiO_2}{(ZnO+SrO)}$$

ranges from about .3 to about 1.5 and wherein the total weight of the silica, zinc oxide, alumina, strontium oxide, and inorgainc activator ranges from about 85 to about 100 weight percent of the composition, the remaining about 15 to about 0 weight percent being other compatible inorganic glass-making ingredients.

In the specific practice of this invention, a glass body is prepared by melting the aforementioned glass composition and cooling the resulting melt to its annealing temperature or below so as to form a solid, homogenous glass body; thereafter, said glass body is heated to a crystallization temperature above its annealing temperature for a period of time so as to form in situ a quantity of crystals sufficient for the desired luminescence. Although the exact quantity of crystals is difficult to measure, it is believed that optimum conditions are approached by in situ crystallization of more than 50 volume percent of the glass body, e.g. as determined by X-ray diffraction of powder samples.

By the term "other compatible, glass-making ingredients" is meant inorganic compounds which are glass modifiers compatible with the other components to form a glass. Such modifiers can serve various purposes such as making the batch more easily melted, or they can serve to improve the properties of the glass or of the final product, as is well understood in the art.

Such modifiers may lower the melting temperature of the batch, or improve the properties of the glass or the final product. Particularly, they prevent the glass from cooling to a translucent essentially non-transparent glass. A preferred embodiment of the invention corresponds to glass compositions containing as modifiers at least 2 aggregate weight percent, usually 2 to 8 percent, of a material selected from $Na_2O$, $Li_2O$, or $B_2O_3$, or any mixture of two or more of these.

As noted hereinbefore, an "inorganic activator" is any suitable inorganic substance which can be incorporated into a host crystal so as to provide the requisite electronic arrangement necessary for a luminescent center. In the practice of this invention, it has been discovered that best results are obtained with small effective amounts of MnO, typically a trace to about 5 weight percent MnO.

An especially useful group of glass compositions of this invention are those which comprise about 38 to about 55 weight percent of silica, about 39 to about 50 weight percent zinc oxide, about 2 to about 5 weight percent alumina, about 6 to about 7.5 percent strontium oxide, and about 0.1 to about 2 weight percent inorganic activator such as manganese oxide. With such glasses the temperature for crystallization is usually from about 1400° F. to about 1600° F., and the time of heating may vary from about 1 minutes to about 20 hours. The glasses from which the ceramic materials are made can consist essentially of the foregoing ingredients in the amounts set forth. Usually the glasses are about 85 to about 100 weight percent of such ingredients and about 15 to about 0 weight percent of other compatible glass-making inorganic oxides.

The crystallized products of the invention usually contain willemite or other luminescent zinc and silica containing crystal. Strontium oxide can enter the crystal structure of willemite, and it is also useful in that it tends to stabilize glass compositions; devitrification tendencies on cooling are thereby minimized without sacrifice of luminescent output. The ratio of silica to zinc oxide and strontium oxide is important, since compositions in which the ratio substantially exceeds 1.5 have decreased luminescence. The proportion of alumina is also restricted, since quantities above about 7 weight percent allow formation of excessive quantities of zinc aluminate; the latter compound has an expansion coefficient much higher than that of zinc silicate, and their coexistence in a ceramic body may cause cracking or crazing. However, small amounts of alumina are beneficial in reducing a tendency of glasses to devitrify prematurely.

It has been found highly advantageous to melt the batch corresponding to the glass under reducing conditions, either by maintaining a reducing atmosphere, or more preferably by incorporating a reducing agent in the batch which will remain in the melt. A reducing atmosphere or environment during subsequent heat treatment has also been discovered to be beneficial. Suitable reducing additives are stannic oxide and carbonaceous materials in which carbon has an oxidation number less than $+4$.

Stannic oxide present in excess of that required for reduction causes poisoning of luminescence. Additives such as titania, ceric oxide and vanadium pentoxide are ineffective as reducing agents, and also may exert a poisoning effect.

The protection afforded the crystalline material by the surrounding glassy matrix is of great importance in commercial application. Besides affording substantial protection to chemical poisons, the presence of the glass allows the phosphor to be ground or otherwise abraded without the substantial decrease in luminescence which accompanies common use of phosphors prepared by sintering. It is also known that conventional luminescent material prepared by fusing mixtures of powdered glass and crystalline phosphors are characterized by poor structural properties. This is due in part to the entrapment of air during fusing, which then appears as tiny bubbles or seeds. The crystalline materials of the present invention are essentially void free.

Representative glass compositions of this invention and useful in the method to form products of the invention are reported by Example Number in Table I. The symbol for carbon is used to represent materials in which carbon has an oxidation number of less than $+4$. The weight percent is given relative to the glass composition, although it is understood in the art that no carbonaceous materials of the type described remain in the glass.

All the batches were prepared from analytical reagent or luminescent grade chemicals with the exception of alumina and silica; the alumina used was 90 mesh Norton R. R. Alundum, and the silica used was Kona Quintus Quartz, unless otherwise specified. The components were mixed by agitation in a glass jar and placed in a 90 percent platinum 10 percent rhodium crucible for melting. Conversion to a glass was carried out in a gas-fired or electric furnace at temperatures ranging from about 2600° F. to 2900° F., and the glass was subsequently formed into discs. The discs thus obtained were cut into pieces, and were heat treated in a gas-fired or electric furnace to

TABLE I

| Example No. | Parts by weight | | | | | | |
|---|---|---|---|---|---|---|---|
| | 1 | 2 | 3 | 4 | 5 | 6 | 7 |
| $SiO_2$ | 42.6 | 38.1 | 39.9 | 39.4 | 44.9 | 45.0 | 45.6 |
| ZnO | 48.4 | 47.6 | 49.8 | 49.9 | 40.4 | 40.3 | 41.0 |
| MnO | 0.24 | 0.25 | 0.25 | 0.25 | 0.25 | 0.20 | 0.25 |
| SrO | 0.00 | 0.00 | 0.00 | 0.00 | 7.00 | 7.00 | 7.10 |
| $Na_2O$ | 1.90 | 4.80 | 5.00 | 4.00 | 2.00 | 2.00 | 2.00 |
| $Al_2O_3$ | 4.00 | 2.90 | 0.00 | 2.50 | 2.50 | 4.00 | 2.50 |
| $B_2O_3$ | 0.00 | 6.70 | 5.00 | 4.00 | 1.50 | 0.00 | 0.00 |
| $Li_2O$ | 1.90 | 0.00 | 0.00 | 0.00 | 1.50 | 1.50 | 1.50 |

| Example No. | Parts by weight | | | | | | |
|---|---|---|---|---|---|---|---|
| | 8 | 9 | 10 | 11 | 12 | 13 | 14 |
| $SiO_2$ | 43.0 | 43.4 | 44.7 | 44.3 | 44.1 | 44.8 | 44.6 |
| ZnO | 48.0 | 39.0 | 40.2 | 39.9 | 39.7 | 40.4 | 40.1 |
| MnO | 0.2 | 0.7 | 0.7 | 1.5 | 1.9 | 0.5 | 1.0 |
| SrO | 0.00 | 6.8 | 7.0 | 6.9 | 6.9 | 7.0 | 7.0 |
| $Na_2O$ | 3.8 | 1.9 | 2.0 | 2.0 | 2.0 | 2.0 | 2.0 |
| $Al_2O_3$ | 4.8 | 3.9 | 4.0 | 3.9 | 3.9 | 4.0 | 4.0 |
| $Li_2O$ | 0.00 | 1.5 | 1.5 | 1.5 | 1.5 | 1.5 | 1.5 |
| $SnO_2$ | 0.00 | 2.9 | 0.00 | 0.00 | 0.00 | 0.00 | 0.00 |

| Example No. | Parts by weight | | | | | | |
|---|---|---|---|---|---|---|---|
| | 15 | 16 | 17 | 18 | 19 | 20 | 21 |
| $SiO_2$ | 44.2 | 45.3 | 44.9 | 44.5 | 44.5 | 54.5 | 52.0 |
| ZnO | 39.8 | 43.3 | 40.4 | 40.2 | 40.2 | 39.5 | 41.0 |
| MnO | 1.7 | 0.3 | 0.1 | 0.48 | 0.64 | 0.5 | 0.5 |
| SrO | 6.9 | 7.1 | 7.0 | 6.96 | 6.96 | 0.00 | 0.00 |
| $Na_2O$ | 2.0 | 2.0 | 2.0 | 0.00 | 0.00 | 0.00 | 1.5 |
| $Al_2O_3$ | 3.9 | 0.00 | 4.0 | 3.97 | 3.97 | 0.00 | 3.0 |
| $B_2O_3$ | 0.00 | 0.00 | 0.00 | 1.98 | 1.98 | 4.0 | 0.00 |
| $Li_2O$ | 1.5 | 2.0 | 1.5 | 1.5 | 1.5 | 1.5 | 2.0 |
| C [1] | 0.00 | 0.00 | 0.00 | 0.54 | 0.54 | 0.00 | 0.00 |

| Example No. | Parts by weight | | | | | | |
|---|---|---|---|---|---|---|---|
| | 22 | 23 | 24 | 25 | 26 | 27 | 28 | 29 |
| $SiO_2$ | 44.8 | 44.5 | 33.8 | 44.50 | 41.5 | 44.5 | 44.5 | 44.5 |
| ZnO | 40.3 | 40.18 | 43.3 | 40.18 | 40.18 | 40.18 | 40.18 | 40.18 |
| MnO | 0.5 | 0.48 | 0.60 | 0.60 | 0.48 | 0.48 | 0.48 | 0.48 |
| SrO | 7.0 | 6.96 | 18.5 | 8.98 | 6.96 | 6.96 | 6.96 | 6.96 |
| $Na_2O$ | 2.0 | 0.00 | 0.00 | 0.00 | 1.5 | 0.00 | 0.00 | 0.00 |
| $Al_2O_3$ | 4.0 | 3.97 | 3.8 | 1.97 | 2.0 | 3.97 | 3.97 | 3.97 |
| $B_2O_3$ | 0.00 | 3.92 | 0.00 | 1.98 | 1.98 | 1.90 | 1.98 | 2.81 |
| $Li_2O$ | 1.5 | 0.00 | 0.00 | 1.50 | 1.5 | 0.9 | 0.00 | 0.00 |
| C [1] | 0.53 | 0.54 | 0.54 | 0.54 | 0.54 | 0.54 | 0.54 | 0.54 |
| MgO | 0.00 | 0.00 | 0.00 | 0.00 | 0.00 | 0.60 | 1.88 | 0.60 |
| $ZrO_2$ | 0.00 | 0.00 | 0.00 | 0.00 | 0.00 | 0.00 | 0.00 | 0.50 |

[1] Not a part of product, but a part of the batch in melting.

induce crystallization. Usually, crystallization temperatures of about 1500° F. are preferred under non-reducing conditions while temperatures of about 1700° F. or above are favored when a reducing atmosphere is used.

Systematic variations in batch compositions and in times and temperatures of melting and crystallization heat treatment were made to determine optimum procedures. The composition factors investigated were: optimum ratio of silica to zinc oxide plus strontium oxide (when present); optimum concentration of strontium oxide; optimum concentration of alumina, optimum concentration of manganese oxide as activator; and effectiveness of decolorizing or reducing agents, and optimum concentrations of those found effective.

Measurement of ultraviolet luminescence was carried out on crystallized samples by means of a Model SB 1½ Spectra Brightness Spot Meter (Photo Research Corp., 837 N. Cahuenga Blvd., Hollywood 38, Calif.), under ultraviolet irradiation provided by a Model SL 2537 low-pressure mercury vapor lamp (Ultra-violet Products Company, South Pasadena, Calif.). Cathodoluminescence was measured by standard means on samples previously provided with a conductive coating of antimony and tin oxides 300–400 Angstroms thick. Luminescence was measured on the bombarded side. Maximum light output under cathode ray bombardment was determined as a function of current density and voltage. Sunlight reflectance of polished luminescent samples was tested in bright afternoon sunlight with samples mounted vertically, horizontally or directly facing the sun; reflectance was measured by the spot meter cited above, and the results were compared with a magnesium oxide standard.

One of the furnaces used for melting and crystallization heat treatment was an electric furnace with a 12″ x 12″ x 12″ interior and 8 silicon carbide heating elements. The other was a standard gas furnace in which the percent oxygen in the flue gases was measured during use.

The variations in composition and procedure which were effected are discussed more completely below, and the preparation and testing of those samples which gave optimum luminescence is cited in detail. These examples are not to be construed as limiting the invention.

As previously mentioned the optimum activator concentration is the maximum amount which still avoids concentration quenching. Theoretically, this corresponds to a crystal structure in which each activator ion has only host ions as its nearest neighbors; a probable range is thereby established to determine the most favorable concentration of manganese oxide as an activator. A series of glasses having the basic parts by weights composition of Example 22, excluding manganese oxide and carbon, was prepared, in which the manganese oxide content was, respectively, absent, 0.06 percent, 0.12 percent, 0.245 percent, 0.49 percent, 0.97 percent, 1.45 percent, 1.68 percent and 1.92 percent (weight percentages) in separate samples. The corresponding batches were compounded and mixed as previously described, usually in quantities totaling 100 grams, and melted in a gas fired furnace showing ¾ to 1 percent excess oxygen atmosphere at 2750° F. for 3 hours; the resultant glass was formed into discs. These discs were subsequently cut into pieces, and samples of each composition were treated isothermally at temperatures varying from 1300° F. to 1600° F. in 50° F. increments for 19 hours. The resultant ceramic bodies contained more than 50 volume percent crystalline material. The samples thus obtained were subjected to tests for ultraviolet luminescence, and the sample containing no manganese was found to exhibit no measurable luminescence under the conditions of the test. The most favorable results found were an output of 24 foot-lamberts obtained from the sample containing 0.49 percent manganese oxide, and crystallized at 1500° F. The same sample when polished gave a luminescent output of 50 foot-lamberts. Reflectance measurements in bright sunlight were made as previously described, and these samples showed values of 95 percent and 98 percent reflectance of the magnesium oxide standard in horizontal and vertical position, respectively. Reflectance directly facing the sun was 5900 percent that of the standard because of specular reflectance of the polished luminescent ceramic which is not possible with diffusely reflecting surfaces such as powder layers of magnesium oxide or powder layers of phosphors. Unpolished samples were also given a conductive coating by the aforedescribed procedure, and then tested for cathodoluminescence by standard means. The maximum light output on the bombarded side was 920 foot-lamberts at 25 kv. and 133 microamperes per sq. in.; current saturation was not attained.

The samples described in the preceding paragraph were all purple, probably due to the presence of manganese in its higher oxidation states. Decolorizing, i.e., reducing, agents were added to the composition shown in Table I, Example 22, excluding carbon. Stannic oxide was incorporated into the base glass in concentrations of 0.27 percent, 0.42 percent and 0.84 percent (weight percent) and melting was effected at 2750° F. for 3 hours. Heat treatments were carried out on the resultant formed glasses at temperatures varying from 1400° F. to 1600° F. in 50° F. increments, and for durations of 3, 6, and 19 hours. The resultant samples were more than 50 volume percent crystalline material, and they were tested for visible luminescence when excited by ultraviolet light by the procedure already described. The most favorable results were an output of 33 foot lamberts, obtained from samples containing 0.27 weight percent stannic oxide, and crystallized at 1400° F. and 1450° F. for 6 hours. Concentrations of stannic oxide above 0.27 weight percent cause a decrease in luminescence, attributable to a slight poisoning effect similar to that known to be exerted by arsenic oxide and potassium oxide.

An investigation of non-poisonous reducing agents was therefore undertaken. To the batch corresponding to the glass composition of Example 22, except carbon, was added 0.10 percent, 0.27 percent and 0.53 percent (weight percent) of sea coal as separate batches, and conversion to glasses was accomplished at 2750° F. for 3 hours in a gas fired furnace in a reducing atmosphere. The resultant glasses were formed as previously described, and the discs thus obtained were crystallized at 1400° F. to 1600° F. with 50° F. increments for 6 hours; the luminescent ceramic bodies thus prepared were more than 50 volume percent crystalline. In this series the best sample, Example 22 itself, was melted in a gas-fired furnace at 2750° F. and contained 0.53 weight percent sea coal; crystallization was effected at 1550° F. for 6 hours. The ultraviolet luminescent output of this sample was 38 foot lamberts. A batch corresponding to the composition of Example 18, Table I, was prepared as previously described, except that silicic acid was used in place of quartz. Melting was achieved at 2750° F. for 3 hours in a gas-fired furnace in a reducing atmosphere. The resultant colorless glass was converted to discs by the method already mentioned and these samples were heat treated in an electric furnace at 1600° F. for 2 hours. A reducing atmosphere of carbon monoxide was obtained by placing the sample in a 1" high, 3/4" ID Inconel tube, and covering each end of the tube with graphite sheets 1/4" x 3" x 4". The samples thus prepared contained more than 50 volume percent crystalline material, and displayed luminescence under ultraviolet excitation which was 98% of that of a commercial P-1 phosphor standard. Two batches corresponding to the composition of Example 19, Table I, were prepared by the general method already described; one of the batches contained spectroscopic grade zinc oxide, while the other was prepared using U.S.P. grade zinc oxide. These batches were melted and formed by the procedure of Example 18, and the discs thus obtained were heat treated by the means therein described at 1700° F. for 2 hours. Both batches yielded samples which were more than 50 volume percent crystalline. These crystalline ceramic materials showed luminescence under ultraviolet irradiation equivalent to that of a commercial P-1 phosphor standard. The relatively high activator content renders these samples less susceptible to current saturation than the other compositions shown.

A batch corresponding to the composition of Example 25, Table I, was melted and converted to glass discs by the general method already described. Separate samples of these discs were subsequently heat treated in air and in a carbon monoxide (reducing) atmosphere for 5 hours at 1550° F. to effect crystallization. The sample treated in air showed ultraviolet activated luminescence at 40% that of the P-1 phosphor standard, while the sample resulting from crystallization in a reducing atmosphere showed luminescence 85% that of the standard. Comparison of samples of the composition corresponding to Example 26, Table I, were also carried out using heat treatments of 5 hours at 1600° F. in an air and a reducing atmosphere; the crystalline materials thus obtained showed ultraviolet activated luminescent of 5% and 70% that of the standard, respectively.

The superior resistance of the ceramic materials of this invention to diminution of luminescence caused by grinding was established by comparison with a phosphor of the same composition prepared by solid state reaction. 300 grams of the batch composition corresponding to Example 22, Table I, and 600 millimeters of distilled water were mixed in a cylindrical alumina ball mill for 1 hour. The resultant mixture was dried in an electric furnace and allowed to cool. 50 grams of dry material thus obtained was placed in a platinum-rhodium crucible, and sintered in an electric furnace in an air atmosphere at 2000° F. for 1 hour. The luminescent solid material thus obtained was ground by placing it in an alumina cylinder of 2 1/4" diameter and 2 3/4" length containing a 1/2" diameter alumina ball, and vibrating this container in the direction of its long axis; the resultant particle size was 44–53 microns. The sample thus prepared had an ultraviolet luminescence output of 17 foot-lamberts. A sample of the same composition was converted to a glass by the procedure of the preceding paragraph, and subsequently ground to a particle size of 44–53 microns. The sample thus prepared had an ultraviolet luminescence output of 24 foot-lamberts.

It will be apparent from the detailed description above that maintenance of reducing or at least non-oxidizing conditions in the glass and in the atmosphere in contact with the glass during melting and crystallization is of great importance. The preferred method for maintaining these conditions is the use of carbonaceous reducing agents in which carbon has an oxidation number less than +4, as a batch constituent; materials such as starch, sugar, carbon black nad activated charcoal can be used. Reduction can be effected as well by adding a metal or metal halide in effective amounts or by passing reducing gases into the atmosphere during melting. It is also sometimes advantageous to employ a reducing atmosphere during the crystallization heat treatment step.

It will be evident to those skilled in the art that modifications of this invention can be made without departing from the spirit and scope of this disclosure or the scope of the following claims.

I claim:
1. A luminescent ceramic composition consisting essentially of a glassy matrix containing dispersed inorganic crystals formed in situ from a homogeneous glass containing about 25 to about 60 weight percent silica, about 30 to about 60 weight percent zinc oxide, about 1 to about 7 weight percent alumina, about 1 to about 20 weight percent strontium oxide, and a small effective amount of inorganic activator, wherein the weight ratio of silica to zinc oxide plus strontium oxide ranges from about .3 to about 1.5 and wherein the total weight of the silica, zinc oxide, alumina, strontium oxide and inorganic activator ranges from about 85 to about 100 weight percent of the glass, the remaining about 15 to about 0 weight percent being other compatible inorganic glass-making ingredients.

2. The luminescent ceramic composition of claim 1 wherein the homogeneous glass contains a trace to about 5 weight percent inorganic activator.

3. The luminescent ceramic composition of claim 2 wherein the inorganic activator is manganese oxide.

4. A luminescent ceramic composition consisting essentially of a glassy matrix containing dispersed inorganic crystals formed in situ from a homogeneous glass containing about 38 weight percent to about 55 weight percent silica, about 39 to about 50 weight percent zinc oxide, about 2 to about 5 weight percent alumina, about 6 to about 7.5 weight percent strontium oxide, and about .1 to about 2 weight percent inorganic activator, wherein the weight ratio of silica to zinc oxide plus strontium oxide ranges from about .3 to about 1.5 and wherein the total weight of the silica, zinc oxide, alumina, strontium oxide, and inorganic activator ranges from about 85 to about 100 weight percent of the glass, the remaining about 15 to about 0 weight percent being other compatible inorganic glass-making ingredients.

5. The luminescent ceramic composition of claim 4 wherein the inorganic activator is manganese oxide.

6. The luminescent ceramic composition of claim 4 wherein the other compatible inorganic glass-making ingredients include at least about 2 aggregate weight percent of at least one oxide selected from the group consisting of sodium oxide, lithium oxide, and boron trioxide.

7. The luminescent ceramic composition of claim 4 wherein the homogeneous glass consists essentially of about 42 to about 46 weight percent silica, about 39 to about 41 weight percent zinc oxide, about 3 to about 4 weight percent alumina, about 6 to about 7 weight percent strontium oxide, and about .4 to about .6 weight percent manganese oxide.

8. The luminescent ceramic composition of claim 4 wherein the homogeneous glass consists essentially of about 45 weight percent silica, about 40 weight percent zinc oxide, about 7 weight percent strontium oxide, about 4 weight percent alumina, about 2 weight percent sodium oxide, about 1.5 weight percent lithium oxide, and about .5 weight percent MnO.

9. A thermally crystallizable glass consisting essentially of about 25 to about 60 weight percent silica, about 30 to about 60 weight percent zinc oxide, about 1 to about 7 weight percent alumina, about 1 to about 20 weight percent strontium oxide, and a small effective amount of inorganic activator, wherein the weight ratio of silica to zinc oxide plus strontium oxide ranges from about .3 to about 1.5 and wherein the total weight of the silica, zinc oxide, alumina, strontium oxide, and inorganic activator ranges from about 85 to about 100 weight percent of the glass, the remaining about 15 to about 0 weight percent being other compatible inorganic glass-making ingredients.

10. A thermally crystallizable glass consisting essentially of about 38 to about 55 weight percent silica, about 39 to about 50 weight percent zinc oxide, about 2 to about 5 weight percent alumina, about 6 to about 7.5 weight percent strontium oxide, and about .1 to about 2 weight percent manganese oxide, wherein the weight ratio of silica to zinc oxide plus strontium oxide ranges from about .3 to about 1.5 and wherein the total weight of the silica, zinc oxide, alumina, strontium oxide, and MnO ranges from about 85 to about 100 weight percent of the glass, the remaining about 15 to about 0 weight percent being other compatible inorganic glass-making ingredients.

11. A process for preparing a luminescent composition consisting essentially of a multiplicity of inorganic crystals formed in situ and dispersed in a glass matrix whch comprises melting a homogeneous glass composition consisting essentially of about 25 to about 60 weight percent silica, about 30 to about 60 weight percent zinc oxide, about 1 to about 7 weight percent alumina, about 1 to about 20 weight percent strontium oxide, and a small effective amount of inorganic activator, wherein the weight ratio of silica to zinc oxide plus strontium oxide ranges from about .3 to about 1.5 and wheren the total weight of the silica, zinc oxide, alumina, strontium oxide, and inorganic activator ranges from about 85 to about 100 weight percent of the glass, the remaining about 15 to about 0 weight percent being other compatible inorganic glass-making ingredients, cooling the glass to its annealing temperature or below, and thereafter heating the glass at a crystallization temperature above its annealing temperature.

12. The process of claim 11 wherein the glass composition is melted under reducing conditions.

13. The process of claim 11 wherein the glass is crystallized under reducing conditions.

14. The process of claim 12 wherein the glass is crystallized under reducing conditions.

15. The process of claim 13 wherein the inorganic activator is manganese oxide.

16. The process of claim 15 wherein the glass composition contains a trace to about 5 weight percent manganese oxide.

17. The process of claim 11 wherein the glass composition contains about 38 to about 55 weight percent silica, about 39 to about 50 weight percent zinc oxide, about 2 to about 5 weight percent alumina, about 6 to about 7.5 weight percent strontium oxide, and about .1 to about 2 weight percent inorganic activator.

18. The process of claim 14 wherein the inorganic activator is manganese oxide.

References Cited
UNITED STATES PATENTS

| | | | |
|---|---|---|---|
| 2,219,895 | 10/1940 | Hanlein | 106—52 |
| 2,920,971 | 1/1960 | Stookey | 106—39 |
| 3,005,721 | 10/1961 | Cerulli | 106—48 |
| 3,013,362 | 12/1961 | Calkins et al. | 106—39 |
| 3,113,878 | 12/1963 | Martin | 106—39 |
| 3,300,670 | 1/1967 | Veres | 106—52 |

OTHER REFERENCES

Glass Industry, "Recent Translations of Russian Papers of Interest to the Glass Industry," May 1958, p. 275.

Weyl, W. A.: Coloured Glasses, pub. by Dawson's of Pall Mall, London, 1959 (pp. 469–474).

HELEN M. McCARTHY, Primary Examiner

U.S. Cl. X.R.

106—39, 52